United States Patent Office 3,453,249
Patented July 1, 1969

3,453,249
PRODUCTION OF ACRYLONITRILE POLYMERS
Jenö Szita and Herbert Marzolph, Dormagen, and Otto
 Unger, Goddelau, Germany, assignors to Farben-
 fabriken Bayer Aktiengesellschaft, Leverkusen, Ger-
 many, a corporation of Germany
No Drawing. Filed June 9, 1966, Ser. No. 556,286
Claims priority, application Germany, June 23, 1965,
 F 46,409
Int. Cl. C08f 1/62, 1/08
U.S. Cl. 260—85.5       7 Claims

ABSTRACT OF THE DISCLOSURE

Process for the production of acrylonitrile in a gel-free, spinnable solution by polymerizing acrylonitrile or acrylonitrile or acrylonitrile monomer mixtures in an organic solvent containing a redox catalyst system comprising an organic peroxide and a reducing agent, which is a sulphone having the formula:

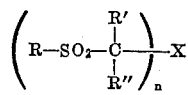

wherein R is an aromatic hydrocarbon radical; R' and R'' are hydrogen or alkyl; $n$ is 1 or 2; X is —OH or >N—R'''; and R''' is alkyl or hydroxyalkyl.

---

This invention relates to the production of acrylonitrile polymers. More specifically the invention relates to a process for the preparation of a spinning solution of polymers or copolymers of acrylonitrile, in which acrylonitrile, either alone or together with other ethylenically unsaturated compounds, is polymerised in organic solvents, preferably in dimethylformamide, with the aid of a redox catalyst system. The viscous solution obtained can be spun either immediately after polymerization is terminated or after removal of the residues of unreacted monomer.

This process offers important advantages over the widely used process in which polymerisation is carried out in an aqueous medium and in which the precipitated polymer must first be separated from the reaction medium, washed, dried and in some cases ground before it can be worked up with a suitable solvent to form a spinnable solution. These working up steps are, of course, eliminated in solution polymerisation so that the process is considerably simplified. Apart from the advantages in technical procedure, the process of solution polymerisation also makes it possible to achieve important improvements in quality, for example it is possible to prepare spinning solutions completely free from gel and moreover, it is possible to obtain much higher solution concentrations than is possible when the polymer has to be dissolved. These properties have a particularly advantageous effect on the spinning technique (easier filtration, better spinning conditions).

There are however certain difficulties connected with the solution polymerisation process which have long delayed its wide use on a commercial scale. These difficulties are:

(1) It has been found that technically useful products can only be prepared with the aid of radical polymerisation catalysts. The suitable organic solvents such as dimethylformamide, dimethylsulphoxide, ethylene-carbonate and γ-butyrolactone, however, have been found to have a high chain transfer capacity in the radical chain reaction. Owing to the high transfer constants of the solvents, it has therefore only been possible to prepare low molecular weight products at higher reaction velocities. In other words, the relatively high molecular weights required for fibres (K-value above 75, H. Fikentscher, Cellulosechemie 13 (1952) 60) could be obtained at low reaction velocities.

(2) Another inconvenience results from the strong tendency to yellowing of the polyacrylonitrile solutions. Long reaction times and in particular high reaction temperatures can lead to commercially useless or inferior products.

(3) Moreover, it is only possible to use reagents that are completely soluble in the reaction medium and remain in solution in the course of polymerisation. For example, undissolved residues of catalyst or precipitated salts increase the tendency to gel formation, impair the quality of the spinning solution and make further working up more difficult.

(4) The residues of catalyst which do not react during polymerisation can no longer be removed after completion or termination of polymerisation and they may therefore lead to undesired reactions (production of low molecular weight polymers, discoloration) during subsequent working up of the solution.

From what has been said above, it is clear that the activity and other properties of the catalysts used, which also to a large extent determine the reaction conditions, have a considerable influence on the factors governing commercial production and on the quality of the spinning solutions and therefore to a large extent determine the possibility of using the process and its practical value.

To overcome or reduce the above-mentioned difficulties, one should therefore use catalysts which are readily soluble in the reaction medium and are so highly active even at low concentrations that polymerisation can be carried out in a reproducible manner at relatively high speed at low temperatures. At the same time, the spinning solutions formed must be pale, clear, free from gel and stable to discoloration and gel formation.

In the processes hitherto known, it has not been possible to fulfil completely all these requirements at the same time. As catalysts for carrying out solution polymerisation of acrylonitrile in organic solvents, it has been proposed to use boron trifluoride, azo compounds, inorganic and organic peroxides or the sodium salt of toluene sulphinic acid. It was then found that either the yields in polymers and the molecular weights obtained were not sufficient (boron trifluoride) or high reaction temperatures or long reaction times were necessary (azo compounds and peroxides alone) in order to obtain technically useful products. In the case of peroxides, especially in dimethylformamide solution, the high reaction temperatures led particularly easily to undesirable discolourations in the solutions. When inorganic peroxides or alkali metal salts of sulphinic acids are used, the low solubility of these compounds in the reaction medium is also very inconvenient and the fact that when preparing the solution and during polymerisation, marked salt precipitates are formed which are either completely insoluble or can only be dissolved at very high temperatures. The spinnability and durability of the spinning solutions are thus considerably reduced. When alkali metal salts of sulphinic acids are used alone, it is in addition necessary for certain amounts of atmospheric oxygen to be present, which makes it much more difficult to render the process reproducible, especially on a commercial scale. When azo catalysts are used, on the other hand, atmospheric oxygen must be completely excluded on account of its inhibitory effect, and for the same reason, monomers containing polymerisation stabilisers (inhibitors) cannot be used directly but must first be freed from the stabilisers, usually by distillation.

It has now been found that solution polymerisation of acrylonitrile or copolymerisation of acrylonitrile with other monomers can be carried out at low temperatures at relatively high velocity in a reproducible manner by a Redox catalyst system consisting of an organic peroxide and an α-hydroxy or α-aminosulphonone, if desired together with an acid. Pale, clear, gel-free spinning solutions are then obtained which are stable to discolouration and gel formation.

Suitable compounds for use as oxidising components for the Redox system are organic hydroperoxides, keto peroxides, acyl peroxides and acyl peroxide esters such as cumene hydroperoxide, tertiary butyl hydroperoxide, methyl ethyl ketone peroxide, cyclohexanone peroxide, lauroyl peroxide and tertiary butyl permaleate which is particularly effective. The said peroxides as well as their decomposition products are readily soluble in the reaction medium.

As reducing agents there are used α-hydroxy or α-amino-sulphones of the following general formula:

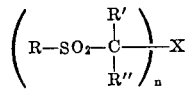

in which R represents an aliphatic or aromatic hydrocarbon radical, R' and R'' represents hydrogen or an alkyl radical, $n$ the integer 1 or 2 and X the groups OH or >N—R''' where R''' may be alkyl, hydroxyalkyl or aryl.

It is preferred to use arylsulphone derivatives in which R is a substituted phenyl radical Y—$C_6H_4$—, in which Y may be hydrogen, alkyl, alkoxy or halogen. The following compounds may be mentioned as examples:

Phenyl sulphone-carbinol:

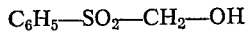

p-tolyl-sulphone-carbinol:

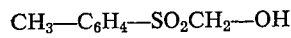

p-chlorophenyl-sulphone-carbinol:

p-tolyl-sulphone-(methyl)-carbinol:

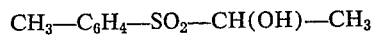

octyl-sulphone-propyl-carbinol:

di-(phenyl-sulphone-methyl)-methylamine:

di-(p-tolyl-sulphone-methyl)-ethylamine:

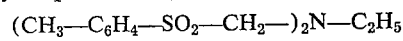

di-(p-methoxyphenyl-sulphone-methyl)-methylamine:

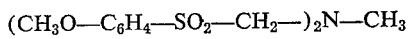

di-(p-chlorophenyl-sulphone-methyl)-ethylamine:

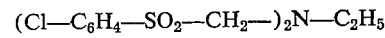

di-(p-tolyl-sulphone-methyl-)ethanolamine:

di-(octyl-sulphone-methyl-)methylamine:

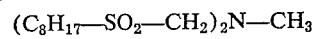

The above mentioned compounds can be prepared by the method described by Meyer (J. prakt. Chem. 63 (1901) 167).

The presence of a strong acid is advantageous with regard to discolouration and thermostability of the solutions. For example, hydrochloric acid, phosphoric acid and in particular sulphuric acid may be used. If the reaction mixture comes into contact with the material containing iron, the presence of oxalic acid has a particularly advantageous effect on the colour tone of the spinning solution. As solvents in which polymerisation is carried out, there may be used dimethylformamide, dimethylacetamide, dimethylsulphoxide, γ-butyrolactone or ethylene glycol carbonate.

The atmospheric oxygen dissolved in the reaction medium does not interfere with polymerisation but access of further quantities of oxygen must be prevented during the reaction. Monomers containing stabilisers such as thiosemicarbazide, ammonia or hydroquinone or their derivatives can also be put into the reaction without purification.

The production of acrylonitrile polymers in form of a spinning solution is carried out by polymerizing a monomer composition containing from 80% to 100% acrylonitrile and up to 20% of a copolymerisable, ethylenically unsaturated compound in an organic polyacrylonitrile solvent. Preferably the polymerization of acrylonitrile is carried out in the presence of other polymerisable comonomers.

If, for example, 1 to 10%, preferably 5 to 7% of an acrylic ester, a vinyl ester or a styrene derivative is polymerised together with acrylonitrile, the solubility of the resulting polymers in the reaction medium increases considerably. It is thus possible to start with higher monomer concentrations and obtain correspondingly higher reaction velocities, molecular weights and polymer concentrations in the solution. Moreover, it is also easier to dye the filaments from the said copolymers. To achieve dyeability to deep colour tones, other components having acid or basic groups, e.g. sulphostyrene, methacroylaminobenzene-benzene-disulphimide or vinyl pyridine may be polymerised into the mixture.

The reaction mixture used for polymerisation as a rule contains 60 to 80 parts by weight of a solvent such as dimethylformamide, preferably 65 to 75 parts by weight of dimethylformamide, 40 to 20 parts by weight of the monomers and 0.05 to 0.5 part by weight each of oxidising agent, reducing agent and if desired an acid, preferably concentrated sulphuric acid. The proportion of oxidising agent to reducing agent may be in the region of 1:0.5 to 1:4. The optimum quantity of acid lies within the ratios of 0.3:1 to 1:1 to the reducing agent. At reaction temperatures between 30 and 60° C., preferably 35 to 45° C., a reaction time of 10 to 30 hours is required for obtaining 65 to 85% conversion of the monomer to polymers. Polymers having a relative viscosity ($\eta_{rel.}$) of 1.75 to 2.0, measured in a 0.5% DMF solution at 20° C. (K-value according to Fikentscher: 75 to 85) are obtained in this way.

When polymerisation is complete, a known polymerisation inhibitor is stirred into the solution. Formation of low molecular weight polymers during subsequent working up of the solution can thus be prevented. The solution is then spun by known dry or wet spinning processes either immediately or after removal of unreacted monomers, e.g. in a thin layer evaporator.

The polyacrylonitrile solutions prepared by the process according to the invention are colourless to pale yellow, clear and free from gel. They can be stored for many days after removal of the monomers without any significant increase in the viscosity of the solutions taking place. The spun filaments have a high degree of whiteness, good thermostability and excellent textile properties. The following examples illustrate more particularly the invention.

Examples 1 to 21

The effectiveness of different Redox systems according to the invention is demonstrated in a test series. Polymerisation was carried out in a completely filled, closed long necked flask of 100 ml. capacity. In all the tests, the reaction mixture contained 65 g. dimethylformamide (DMF), 32.7 g. acrylonitrile (AN) and 2.3 g. methyl acrylate. The catalysts and additives used in each case and their quantities are shown in the following Table 1. The flasks filled with reaction mixture were matured 10 hours in a water bath at 45° C. The extent of reaction was then determined by precipitation in methanol. The relative viscosities of 0.5% polymer solutions in DMF were determined in an Ubbelohde viscosimeter at 20° C. ($\eta_{rel.}$).

TABLE 1

| Test No. | Peroxide name | G. | Reducing agent Formula | G. | Additive Formula | G. | C[1] percent | $\eta_{rel}$ | Colour of the solution |
|---|---|---|---|---|---|---|---|---|---|
| 1 | Cumene hydroperoxide | 0.3 | $(Cl-C_6H_4-SO_2-CH_2-)_2N-CH_3$ | 0.3 | | | 59 | 1.85 | Pale yellow. |
| 2 | do | 0.3 | $(Cl-C_6H_4-SO_2-CH_2-)_2N-CH_3$ | 0.3 | Conc. $H_2SO_4$ | 0.2 | 51 | 1.94 | Colourless. |
| 3 | Methylethylketone peroxide | 0.3 | $(Cl-C_6H_4-SO_2-CH_2-)_2N-CH_3$ | 0.3 | | | 79 | 1.64 | Pale yellowish. |
| 4 | do | 0.3 | $(Cl-C_6H_4-SO_2-CH_2-)_2N-CH_3$ | 0.3 | Conc. $H_2SO_4$ | 0.2 | 74 | 1.71 | Colourless. |
| 5 | Cyclohexanone peroxide | 0.3 | $(Cl-C_6H_4-SO_2-CH_2-)_2N-CH_3$ | 0.3 | | | 56 | 1.88 | Pale yellowish. |
| 6 | do | 0.3 | $(Cl-C_6H_4-SO_2-CH_2-)_2N-CH_3$ | 0.3 | Conc. $H_2SO_4$ | 0.2 | 58 | 1.82 | Colourless. |
| 7 | Lauroyl peroxide | 0.3 | $(Cl-C_6H_4-SO_2-CH_2-)_2N-CH_3$ | 0.3 | | | 60 | 1.86 | Pale yellow. |
| 8 | do | 0.3 | $(Cl-C_6H_4-SO_2-CH_2-)_2N-CH_3$ | 0.3 | Conc. $H_2SO_4$ | 0.2 | 52 | 1.90 | Colourless. |
| 9 | Butylpermaleate | 0.3 | $(Cl-C_6H_4-SO_2-CH_2-)_2N-CH_3$ | 0.3 | | | 81 | 1.62 | Almost colourless. |
| 10 | do | 0.3 | $(Cl-C_6H_4-SO_2-CH_2-)_2N-CH_3$ | 0.3 | Conc. $H_2SO_4$ | 0.2 | 53 | 2.00 | Colourless. |
| 11 | do | 0.3 | $(C_6H_5-SO_2-CH_2-)_2N-C_2H_5$ | 0.3 | | | 83 | 1.61 | Pale yellowish. |
| 12 | do | 0.3 | $(C_6H_5-SO_2-CH_2-)_2N-C_2H_5$ | 0.3 | Conc. $H_2SO_4$ | 0.2 | 51 | 1.92 | Colourless. |
| 13 | do | 0.3 | $(CH_3-C_6H_4-SO_2-CH_2-)_2N-C_2H_5$ | 0.3 | | | 84 | 1.59 | Pale yellowish. |
| 14 | do | 0.3 | $(CH_3-C_6H_4-SO_2-CH_2-)_2N-C_2H_5$ | 0.3 | Conc. $H_2SO_4$ | 0.2 | 49 | 1.95 | Colourless. |
| 15 | do | 0.3 | $(CH_3O-C_6H_4-SO_2-CH_2-)_2N-CH_3$ | 0.3 | | | 87 | 1.56 | Pale yellowish. |
| 16 | do | 0.3 | $(CH_3O-C_6H_4-SO_2-CH_2-)_2N-CH_3$ | 0.3 | Conc. $H_2SO_4$ | 0.2 | 42 | 2.10 | Colourless. |
| 17 | do | 0.3 | $(CH_3-C_6H_4-SO_2-CH_2-)_2N-C_2H_4OH$ | 0.3 | | | 84 | 1.60 | Pale yellowish. |
| 18 | do | 0.3 | $(CH_3-C_6H_4-SO_2-CH_2-)_2N-C_2H_4OH$ | 0.3 | Conc. $H_2SO_4$ | 0.2 | 50 | 1.88 | Colourless. |
| 19 | do | 0.3 | $Cl-C_6H_4-SO_2-CH_2-OH$ | 0.3 | | | 82 | 1.62 | Almost colourless. |
| 20 | do | 0.3 | $Cl-C_6H_4-SO_2-CH_2-OH$ | 0.3 | Conc. $H_2SO_4$ | 0.2 | 33 | 2.18 | Colourless. |
| 21 | do | 0.3 | $(CH_3-C_6H_4-SO_2-CH_2-)_2N-C_2H_5$ | 0.3 | Conc. $H_2SO_4$, $H_2O$ | 0.2/2.0 | 58 | 1.86 | Colourless/cloudy. |

[1] C = Conversion.

Example 22

Polymerisation was carried out in a 25 litre V4A stirrer autoclave equipped with heating jacket, thermometer and connections for vacuum and nitrogen. The reaction mixture consisted of 13 kg. DMF, 6580 g. AN, 420 g. methyl acrylate, 10.5 g. butyl permaleate (=21 g. of a 50% solution in dimethylphthalate), 10 g. di-(p-tolylsulphone-methyl)- ethylamine, 10 g. conc. sulphuric acid and 5 g. oxalic acid. When the reaction mixture had been introduced the autoclave was closed, evacuated quickly (200 mm. Hg) and nitrogen introduced to a pressure of 0.2 excess atmospheres, this pressure being maintained during polymerisation. The reaction temperature was kept between 44 and 47° C. After 22 hours, polymerisation was stopped by the addition of an inhibitor and the pale yellowish, clear solution was immediately spun by a known dry spinning process. Samples were removed in the course of polymerisation and the rates of conversion and K-values (calculated from $\eta_{rel}$.) were determined. The following Table 2 contains the relevant data:

TABLE 2

| Sample No. | Time, hours | Conversion, percent | Solution concentration, percent | $\eta_{rel}$. (0.5% solution) | K-value |
|---|---|---|---|---|---|
| 1 | 2 | 7.5 | 2.62 | 2.07 | 87.5 |
| 2 | 4 | 13.5 | 4.75 | 2.03 | 86.3 |
| 3 | 6 | 21.0 | 7.35 | 1.98 | 85.0 |
| 4 | 16 | 52 | 18.2 | 1.89 | 81.4 |
| 5 | 22 | 70 | 24.5 | 1.85 | 79.7 |

Example 23

The reaction conditions and the reaction vessel were the same as in Example 22. 70 g. methacroylaminobenzene-benzene-disulphimide (acid component of mixture for dyeability), 16 g. methyl ethyl ketone peroxide, 12 g. di-p-chlorophenyl-sulphonemethyl)-methylamine, 10 g. conc. sulphuric acid and 2.5 g. oxalic acid were dissolved in the mixture of 13 kg. DMF, 6.6 kg. AN and 400 g. methyl acrylate and prepared for polymerisation. After a reaction time of 23 hours, a conversion of 68% was obtained. The K-value of the polymer was 85.7. After addition of an inhibitor, the 24% solution was stirred intensively for a further one hour at 55° C. in a vacuum (150 mm. Hg). Part of the unreacted monomers was thereby removed (with some DMF). The pale yellow, clear, 27% solution was then spun by the dry spinning process. Filaments having a white tone in the crude state and good thermostability were obtained. They could easily be stretched to a ratio of 1:7 (3 den) (dry spun!), and could readily be dyed with basic Astrazon dyes.

Example 24

Polymerisation was carried out at 42 to 45° C. in a nitrogen atmosphere in a 150 litre V4A autoclave equipped as described in Example 21. The composition of the reaction mixture was as follows: 65 kg. DMF, 33 kg. undistilled AN (stabilised with $NH_3$), 2 kg. methyl acrylate, 350 g. methacroylaminobenzene-benzene-disulphimide, 80 g. methyl ethyl ketone peroxide, 60 g. di-(p-tolyl-sulphone methyl)ethylamine, 50 g. conc. sulphuric acid and 25 g. oxalic acid. The reaction was stopped after 26 hours and the 29% solution (conversion 81%; K-value 75.2) was diluted with DMF to a polymer content of 25%. The solution could be freed from unreacted monomers down to a residue of 0.7% with the use of a thin layer evaporator. After distillation, the solution had a polymer concentration of about 30% and could readily be spun by the dry spinning process. The storage stability and stability against gel formation of the highly concentrated solution was very good: when it had been left to stand for 24 hours at room temperature there was no increase in viscosity.

What we claim is:

1. A process for the production of acrylonitrile in form of a spinnable solution by polymerizing, at temperatures between 30° and 60° C., a non-aqueous composition comprising 60–80 parts by weight of an organic solvent for polyacrylonitrile, 40–20 parts by weight of monomers, 0.05 to 0.5 part by weight of organic peroxide, 0.05 to 0.5 part by weight of reducing agent; the ratio of said organic peroxide:reducing agent being 1:0.5 to 1:4; said monomers comprising from 80% to 100% acrylonitrile and up to 20% of a copolymerizable, ethylenically unsaturated compound; said reducing agent comprising a sulphone of the formula

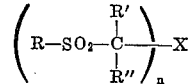

wherein R is an aromatic hydrocarbon radical; R' and R" are hydrogen or alkyl; $n$ is the integer 1 or 2; X is —OH or >N—R'''; and R''' is alkyl or hydroxyalkyl.

2. A process for the production of acrylonitrile in form of a spinnable solution by polymerizing, at temperatures between 30° and 60° C., a non-aqueous composition comprising 60–80 parts by weight of an organic solvent for polyacrylonitrile, 40–20 parts by weight of monomers, 0.05 to 0.5 part by weight of organic peroxide, 0.05 to 0.5 part by weight of reducing agent; the ratio of said organic peroxide:reducing agent being 1:0.5 to 1:4; and 0.05 to 0.5 part by weight of a strong mineral acid; the mineral acid being present in a molar excess of 1.2 to 4 times the reducing agent; said reducing agent comprising a sulphone of the formula

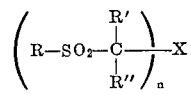

wherein R is an aromatic hydrocarbon radical; R' and R" are hydrogen or alkyl; $n$ is the integer 1 or 2; X is the —OH or >N—R'''; and R''' is alkyl or hydroxyalkyl.

3. A process according to claim 1 wherein said organic solvent is dimethylformamide.

4. A process according to claim 2 wherein said organic solvent is dimethylformamide.

5. The process of claim 1 wherein said copolymerizable ethylenically unsaturated compound is methyl acrylate.

6. The process of claim 2 wherein said copolymerizable ethylenically unsaturated compound is methyl acrylate.

7. The process of claim 2 wherein said strong mineral acid is sulphuric acid.

References Cited
UNITED STATES PATENTS

| | | | |
|---|---|---|---|
| 2,750,357 | 6/1956 | Bredereck et al. | 260—88.7 |
| 2,768,156 | 10/1956 | Bredereck et al. | 260—88.7 |
| 2,813,088 | 11/1957 | Meinel. | |
| 2,900,360 | 8/1959 | Schmitz-Josten. | |
| 3,060,157 | 10/1962 | Goodman et al. | |

HARRY WONG, JR., *Primary Examiner.*

U.S. Cl. X.R.

260—29.1, 30.8, 32.6, 32.2, 79.7, 88.7